April 16, 1929.  C. D. REX  1,709,191
AUTOMOBILE HEADLIGHT
Filed April 19, 1926  2 Sheets-Sheet 1
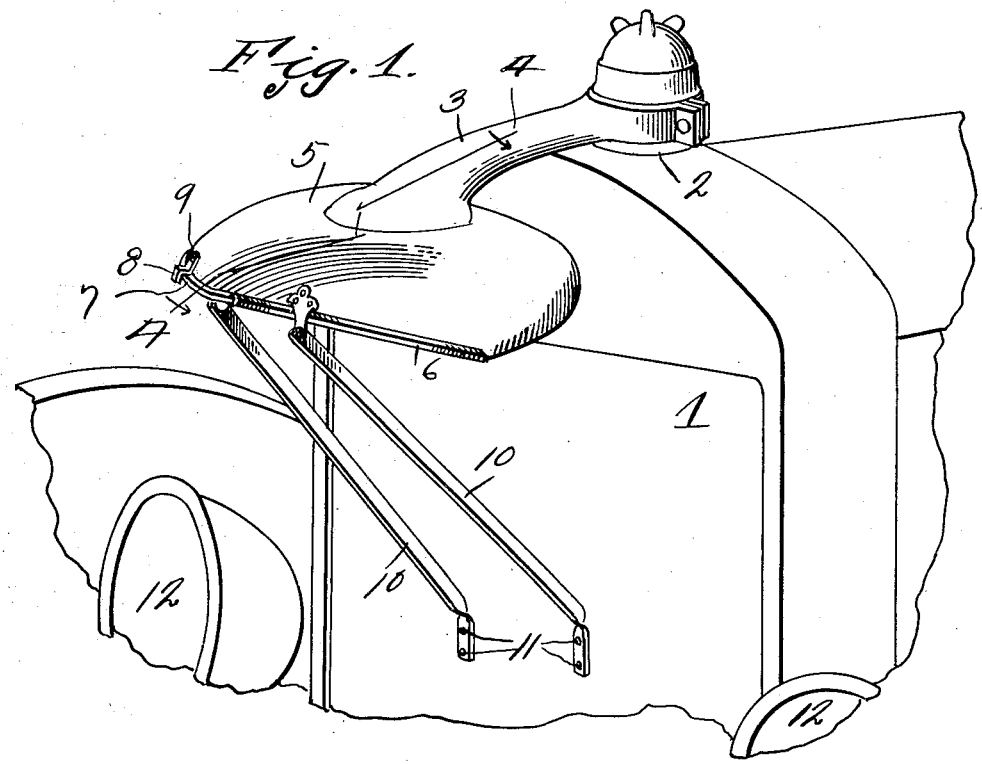
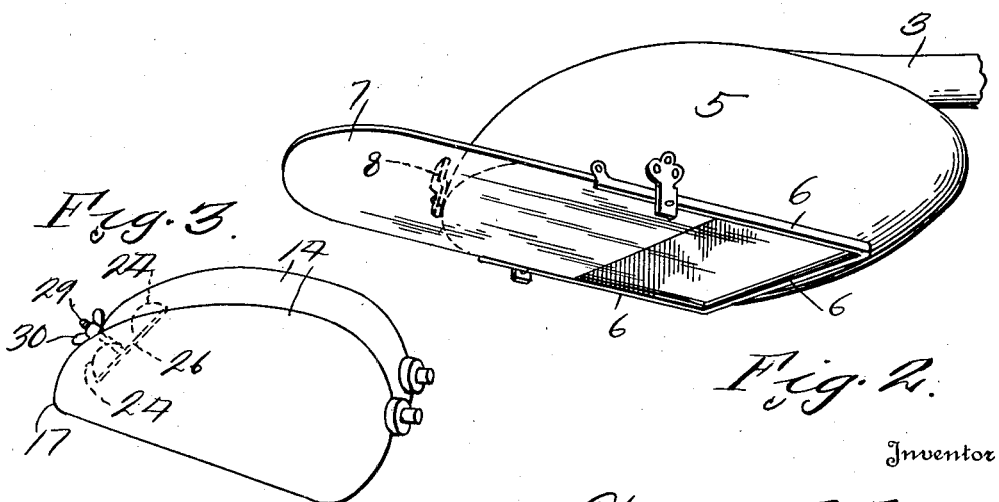
Inventor
Clarence D. Rex.
By George J. Attoch
Attorney

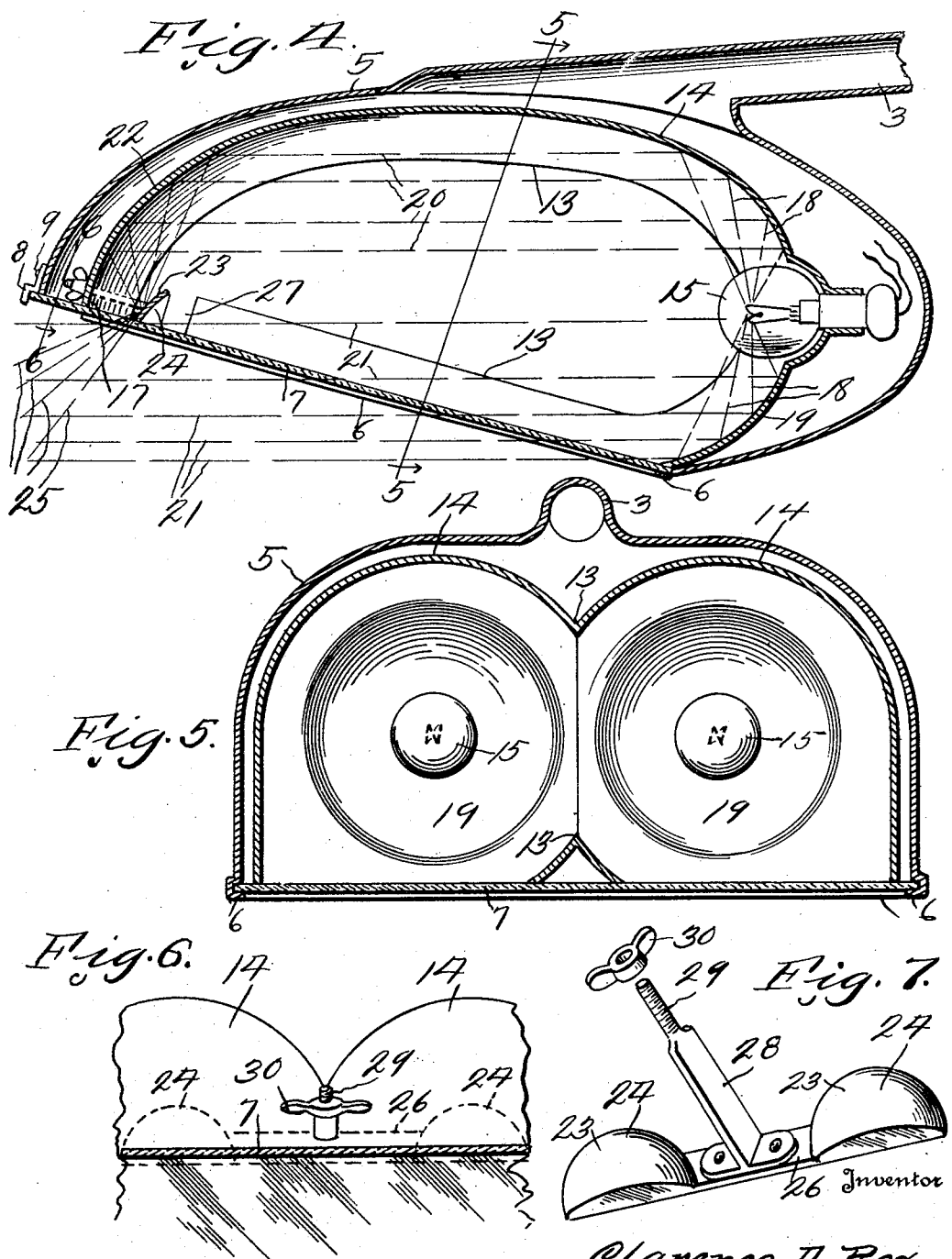

Patented Apr. 16, 1929.

1,709,191

UNITED STATES PATENT OFFICE.

CLARENCE D. REX, OF SOUTH BEND, INDIANA.

AUTOMOBILE HEADLIGHT.

Application filed April 19, 1926. Serial No. 103,114.

The invention relates to automobile headlights, and has for its object to provide a device of this character adapted to be attached to the forward end of an automobile, preferably forwardly of the radiator and constructed in a manner whereby light rays will be projected forwardly onto a roadbed but at an elevation where they will not blind the operator of an approaching vehicle.

A further object is to provide an automobile headlight, which headlight is provided with a plurality of bulbs and reflectors thereby increasing the volume of light rays for better illuminating the roadbed and over a greater area.

A further object is to provide an automobile headlight having a reflector therein, the underside of which inclines upwardly and forwardly and terminates adjacent the axis of the lamp and a transparent closure for the open side of the reflector, and through which transparent member light rays are reflected in a horizontal plane from the inner end of the reflector and a secondary reflector within the reflector adjacent its outer end, and which secondary reflector reflects rays downwardly through the horizontal rays as they are reflected downwardly from the outer end of the main reflector.

A further object is to provide an automobile headlight with a double reflector, the ends of which reflector are parabolas, and the under sides of which reflectors are open and lamps in the rear ends of the reflectors. Also to provide an adjustable double secondary reflector in each of the main reflectors adjacent their outer ends, and which adjustable reflectors receive light rays from the outer ends of the main reflectors and project the same downwardly, thereby cutting off the upward rays.

A further object is to form the two reflectors whereby both ends of each reflector form a parabola, and to connect the reflectors together whereby their axes are in parallel relation and to provide a transversely disposed double secondary reflector slidably mounted in the outer ends of the reflectors and adjustably held.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the headlight showing the same applied to the forward end of a conventional form of automobile.

Figure 2 is a bottom perspective view of the headlight.

Figure 3 is a perspective view of the reflectors.

Figure 4 is a vertical longitudinal sectional view taken on line 4—4 of Figure 1.

Figure 5 is a vertical transverse sectional view taken on line 5—5 of Figure 4.

Figure 6 is a vertical transverse sectional view taken on line 6—6 of Figure 4.

Figure 7 is a perspective view of the double secondary reflectors.

Referring to the drawing, the numeral 1 designates the radiator of a conventional form of automobile, 2 the filling opening flange and 3 an arm clamped to the filling opening flange, which arm extends forwardly and terminates in an elongated casing 5, the underside of which inclines upwardly and outwardly and is open, and is provided with channels 6 at its opposite side, which receive a transparent member 7, preferably formed from glass. The transparent member 7 is held in place by a clip 8 which is pivotally connected at 9 to the outer end of the casing 5, therefore it will be seen the transparent member may be easily removed and placed in position when desired.

Casing 5 is braced by downwardly and inwardly extending arms 10 which are secured at 11 to the forward side of the radiator 1, however any other bracing means may be used.

It has been found with conventional forms of headlights, for instance the type shown at 12, the upwardly projected rays from said headlights blind operators of approaching vehicles, and at the same time they do not entirely illuminate the roadbed forwardly of the vehicle, particularly directly forwardly of the vehicle, and to obviate this difficulty the present device is primarily designed. Disposed within the casing 5 and joined together at 13 are adjacent reflectors 14, the axes of which reflectors are preferably in parallel relation. The reflectors 14 incline upwardly and outwardly and have their underside open and registering with the transparent member 7. Disposed in the rear ends of the reflectors 14 are electric lamps 15, the axes of which are substantially in alinement with the forward ends 17 of the reflectors 14, therefore it will be seen that light rays from the lamps 15 will be cut off by the reflectors and will not be allowed to be projected upwardly from the lamp so that they will blind an operator of an approaching vehicle. The light rays 18 from the lamps 15 first engage the concaved ends 19 of the reflectors 14 and are projected horizontally as indicated by the dashed lines 20 and 21. The dashed lines 21 are below the axes of the lamps 15 and therefore will be projected forwardly in a horizontal plane onto the roadbed and at an elevation which is well below the eyes of an operator of an appraching vehicle. The light rays 20 which are above the axes of the lamps 15 engage the concaved outer ends 22 of the reflectors 14 and are projected downwardly into engagement with the rear sides 23 of the secondary reflectors 24 and are then projected downwardly as shown at 25 across the light rays 21 onto the roadbed, therefore it will be seen the road bed will be illuminated from a point relatively close to the vehicle and for a considerable distance ahead of the vehicle. It will also be seen by using double bulbs 15 and double reflectors a material increase of illuminating power is provided and the road bed will be illuminated for substantially its full width. When the headlight is used the lights 12 are turned out and in operation, under normal conditions, the lamps 12 are used, and upon the approach of a vehicle the lamps 12 are extinguished and the lamps 15 illuminated, however this particular use may be varied.

The secondary reflectors 24 are slidably mounted on the glass 7 and are carried by a transversely disposed bar 26, which extends into both reflectors 14 through the passage 27, and the bar 26 is provided with an upwardly extending member 28, the threaded end 29 of which extends through the forward ends of the reflectors 14 and is provided with a thumb nut 30 adapted to be adjusted for adjusting the positions of the secondary reflectors 24 and holding the same in adjusted positions.

From the above it will be seen that an automobile headlight is provided, wherein double reflectors are used having their under sides open and inclining upwardly and forwardly, whereby horizontal light rays below the axis of the lamps will be projected forwardly from the lamps onto the roadway, and the light rays projected forwardly from the lamps above the horizontal centers thereof will be redirected against secondary reflectors. It will also be seen the secondary reflectors will direct rays downwardly and forwardly, and said secondary reflectors can be adjusted within the main reflectors.

The invention having been set forth what is claimed as new and useful is:

1. An automobile headlight comprising a reflector having its under side open and inclining upwardly and forwardly, said reflector being parabolic, an electric lamp disposed in one end of said reflector and positioned whereby light rays are directed horizontally forwardly through the open under side of the reflector and against the forward concaved end of the reflector, a secondary reflector within the first reflector adjacent the forward end thereof, said secondary reflector being forwardly convexed and positioned whereby horizontal light rays deflected downwardly from the forward end of the first reflector will be reflected forwardly and downwardly through the horizontal light rays passing through the open under side of the first reflector.

2. The combination with the forward end of a parabolic reflector having a light in its rear end and its under side open inclined upwardly and forwardly, of a forwardly convexed adjustable secondary reflector adjacent the forward end of the first reflector, said secondary reflector being positioned whereby light rays reflected downwardly against the same from the forward end of the first reflector will be deflected downwardly and forwardly.

In testimony whereof I affix my signature.

CLARENCE D. REX.